March 9, 1937.  G. J. KALBERER  2,073,066

CASTER

Filed March 9, 1936

INVENTOR.

BY George J. Kalberer

Wood & Wood
ATTORNEYS.

Patented Mar. 9, 1937

2,073,066

UNITED STATES PATENT OFFICE 2,073,066

CASTER

George J. Kalberer, Hamilton, Ohio

Application March 9, 1936, Serial No. 67,796

3 Claims. (Cl. 16—36)

This invention relates to a double or plural wheel caster providing a combination of parts readily assembled and disassembled and of sturdy free operation construction, with the wheel carrying journal mounted in roller bearings sustained by the carriage of the caster, and a vertically disposed load carrying spindle rotatively socketed within the carriage and extending tangentially to the wheel journal for positioning the ground wheels in trailing relation thereto.

An object of the invention is to provide a plural wheel caster with a carriage or body, which interiorly can be packed with a heavy lubricant for furnishing a common and immersing lubricant supply for all of the parts or portions thereof, housed and supported within the carriage for constant lubrication of the parts and holding a lubricant supply adapted to serve for long periods.

Other features of the invention relate to improved structural details of the caster, the relative arrangement of the parts thereof, their manner of assembly—all directed to producing a very durable product adapted for sustaining and wheeling heavy loads over wet floors, all of which will be more fully set forth in the description of the accompanying drawing, in which.

Figure 2:
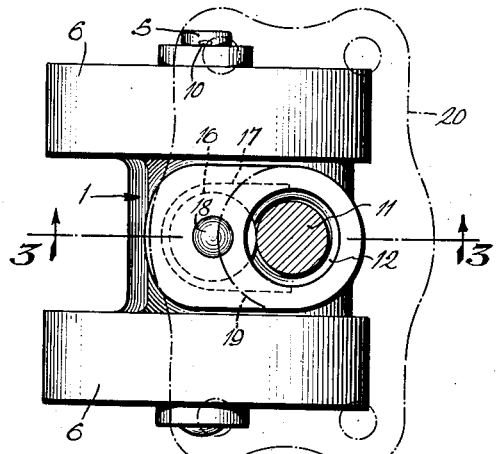
Figure 2 is a section on line 2—2, Figure 1 with the attachment plate in dot and dash lines.
Figure 3:
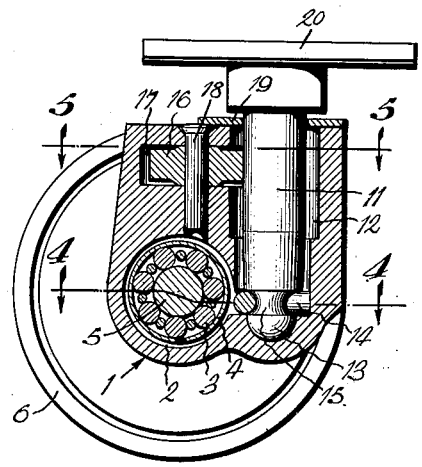
Figure 3 is a section on line 3—3, Figure 2.
Figure 4:
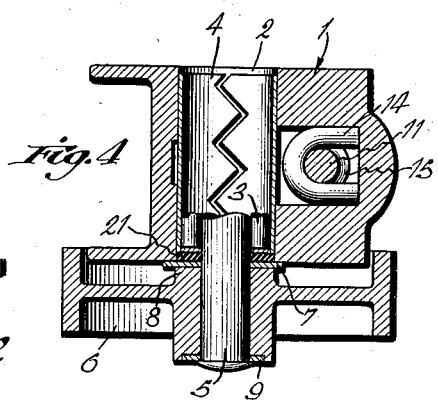
Figure 4 is a section on line 4—4, Figure 3.
Figure 1:
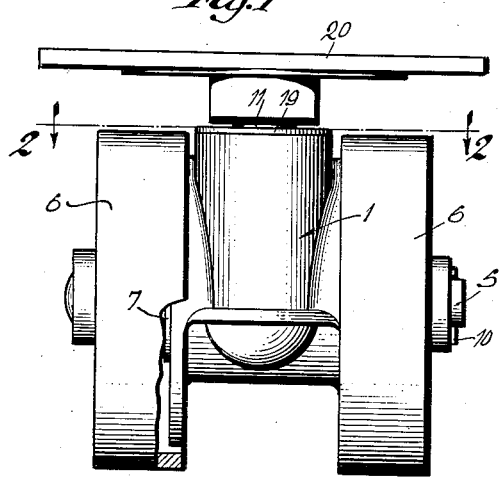
Figure 1 is a side end elevation of the improved caster.
Figure 5:
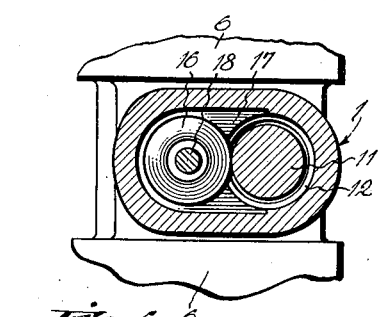
Figure 5 is a section on line 5—5, Figure 3.

Referring to the drawing, 1 indicates the body or carriage of the caster, which carries and supports the various parts of which the caster is organized. The carriage provides a bearing for the caster wheel journal, and therefore has a lateral bore 2 therethrough toward the bottom for the reception of a roller bearing 3 encased by a sleeve 4 engaged and confined within the journal bore 2.

A wheel journal axle 5 is engaged through the roller bearing 3 and protrudes or projects beyond the relative opposite sides of the carriage 1, and at each end thereof respectively carries a wheel 6. A spacer washer 7, loose upon the axle, is interposed between one side of the carriage against which it marginally bears and the inner end of the hub 8 of a wheel, the washer serving also as a closure for an end of the journal bore to confine the roller bearing therein.

The outer side of the wheel hub has a washer 9 recessed therein, loose on the axle and engaging a headed end of the axle for one end, and a cotter pin 10 projected through an orifice in the axle for the wheel on the opposite end of the axle, provided for assembling and disassembling the parts. A load bearing spindle or swivel post 11 is freely socketed within an aperture or cavity 12, formed vertically in the carriage, tangential to the wheel journal bore or cavity, a preferred expediency in casters of this class.

The lower end of the spindle is semi-spherical, providing a rounded head 13 seating into a semispherical socket in the carriage at the inner extremity of the aperture or socket 12, for rotatably sustaining the spindle. The spindle is confined within its socket seat by a U-shaped clip 14, straddling the spindle adjacent its head and engaged within an annular groove 15 in the periphery of the spindle, adjoining its semi-spherical head 13.

The clip is inserted within a transverse slot, open at its inner end to the journal bore 3, and is confined against lateral displacement from the spindle by the roller bearing sleeve 4. The roller bearing is removed from the carriage for inserting or removing the spindle retaining clip 14.

The spindle is free to oscillate, but when sustaining a load, peripherally rotatably bears against a roller 16 located within a lateral aperture 17 in the carriage, communicating with the aperture 12. The roller 16 is journalled upon a pin 18 vertically disposed in the carriage and confined against vertical displacement by a washer 19 on the spindle 11, which also serves as a closure for the upper open end of the spindle socket or aperture 12.

The upper end of the spindle carries the usual attachment plate 20 for securing the caster to the furniture or article which it is to render mobile. The structure of the carriage and relative assembly of the parts within inter-communicating apertures in the carriage provide for packing the same with a grease lubricant, supplied from the spindle socket and sealed against leakage at the opposite ends of the wheel axle journal by packing rings 21 upon the axle and in peripheral engagement with the journal bore 3.

The caster is particularly adaptable for application to crates employed for transporting merchandise about a plant or factory, wherein the floor over which the crate is wheeled carries considerable soil and moisture, as in dairy plants, which is very severe on the casters, causing a quick deposit of heavy corrosion upon the working parts, interfering with their freedom of movement and destroying the efficiency of the caster. With the carriage internally packed with a heavy lubricant securely sealed therein against leakage and imbedding the working parts housed or extended therein with all of the cavities or apertures communicating for a common lubricant supply insures the lubrication of all parts, and provides for a capacity of lubricant to hold over long periods before requiring any replenishing. The parts are continuously maintained in a thoroughly lubricated working condition and freedom of action, and are protected against corrosion.

A heavy lubricant thoroughly packed within the carriage serves to withhold the collection of any sediment or moisture to the interior of the carriage so that smooth running and frictionless action of the working parts is efficiently maintained for long periods. The construction provides for assembly and disassembly of the parts, which are very sturdy and durable.

Having described my invention, I claim:

1. A plural wheel caster comprising a carriage, a roller bearing for the journal of the wheels of the caster housed and axially confined within said carriage, a journal cooperatively engaged with said roller bearing and projecting beyond opposite sides of said carriage, carrying a wheel respectively at each of its opposite ends, a spindle projecting into a cavity in said carriage tangential to the wheel journal cavity, having a semispherical extremity seating in a socket as a terminal for said cavity, a U-shaped clip encased within the carriage laterally of the spindle and engaging within an annular groove therein for confining the spindle against axial displacement, and a roller journal within said carriage for peripheral contact with the spindle providing a lateral anti-friction bearing therefor.

2. A plural wheel caster comprising a carriage, a journal bearing within and projecting beyond opposite sides of said carriage, carrying a wheel respectively at each of its opposite ends, a spindle projecting into a cavity in said carriage tangential to the wheel journal cavity, having a semispherical extremity seating in a socket as a terminal for said cavity, a U-shaped clip encased within the carriage laterally of the spindle and within an annular groove therein for confining the spindle against axial displacement, and a roller journal within said carriage for peripheral contact with the spindle providing a lateral anti-friction bearing therefor.

3. A plural wheel caster comprising a carriage, a journal bearing within and projecting beyond opposite sides of said carriage, carrying a wheel respectively at each of its opposite ends, a spindle projecting into a cavity in said carriage tangential to the wheel journal cavity, having a semispherical extremity seating in a socket as a terminal for said cavity, a removable clip encased within the carriage laterally of the spindle and within an annular groove therein for confining the spindle against axial displacement, a roller journal within said carriage for peripheral contact with the spindle providing a lateral anti-friction bearing therefor, said journal, spindle and roller lying within communicating chambers in the carriage adapted to be packed with a heavy lubricant for immersing and lubricating said parts, and packing means about the journal for sealing against leakage of lubricant from said carriage.

GEORGE J. KALBERER.